United States Patent [19]

Brown et al.

[11] Patent Number: 5,317,053

[45] Date of Patent: May 31, 1994

[54] METHOD FOR PRODUCTION OF HIGH SOLID AQUEOUS CALCIUM CARBONATE SUSPENSIONS

[75] Inventors: Alan J. Brown; Michael S. Darsillo, both of Milledgeville; O. Wayne Bentley, Jr., Gordon, all of Ga.

[73] Assignee: ECC International Inc., Atlanta, Ga.

[21] Appl. No.: 924,428

[22] Filed: Jul. 31, 1992

Related U.S. Application Data

[63] Continuation of Ser. No. 546,397, Jun. 29, 1990, abandoned.

[51] Int. Cl.$^5$ .............................................. C08K 3/26
[52] U.S. Cl. ................................. 524/425; 106/465; 526/240
[58] Field of Search ............... 524/425; 106/447, 461, 106/465

[56] References Cited

U.S. PATENT DOCUMENTS

| 4,509,987 | 4/1985 | Farrar et al. |
| 4,775,420 | 11/1988 | Gonnet et al. |
| 4,840,985 | 6/1989 | Gonnet et al. |
| 4,868,228 | 9/1989 | Gonnet et al. |
| 4,892,902 | 1/1990 | Shioji ........................... 524/417 |

FOREIGN PATENT DOCUMENTS

| 0108842 | 5/1984 | European Pat. Off. |
| 0129329 | 8/1989 | European Pat. Off. |

Primary Examiner—Christopher Henderson
Attorney, Agent, or Firm—Klauber & Jackson

[57] ABSTRACT

A method for producing a high solids aqueous slurry of particulate calcium carbonate having highly stable aging characteristics, comprising dispersing in water at at least 70% by weight solids, a finely divided particulate calcium carbonate, utilizing as a dispersing agent from 20 to 34 lbs/ton of dry mineral (expressed as 40% actives), of a copolymer of acrylic acid and a sulfonated vinyl monomer, which is converted to the salt form by from about 30 to 50% of its carboxylic acid sites being neutralized with a polyvalent cation, and substantially the balance of said carboxylic sites being neutralized with a monovalent cation.

7 Claims, 3 Drawing Sheets

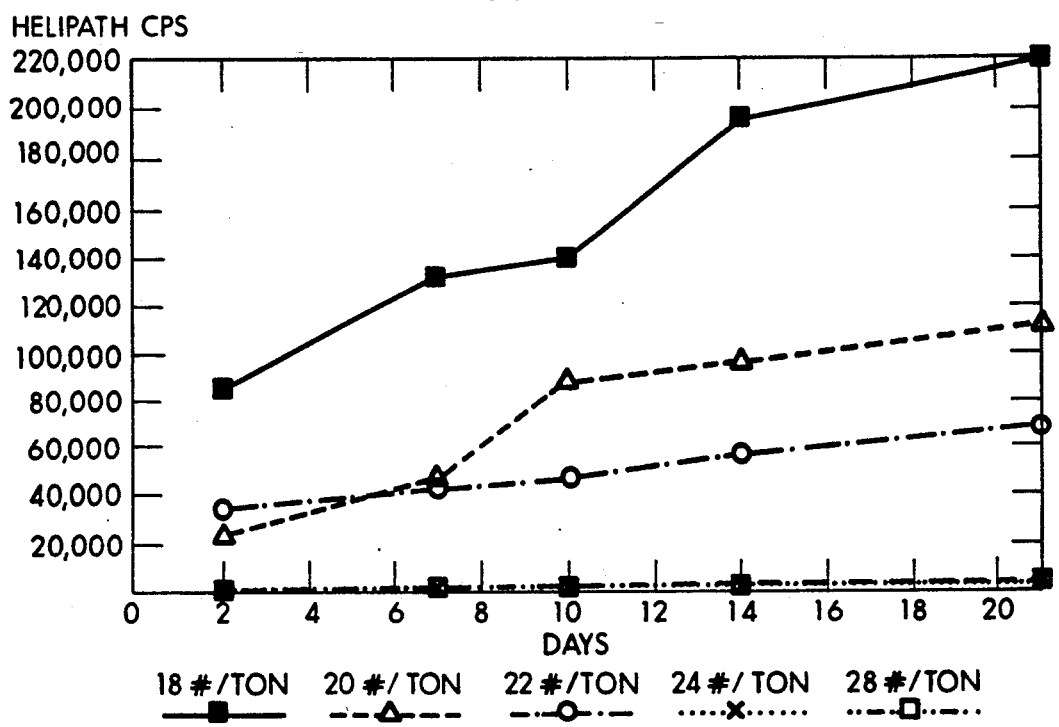
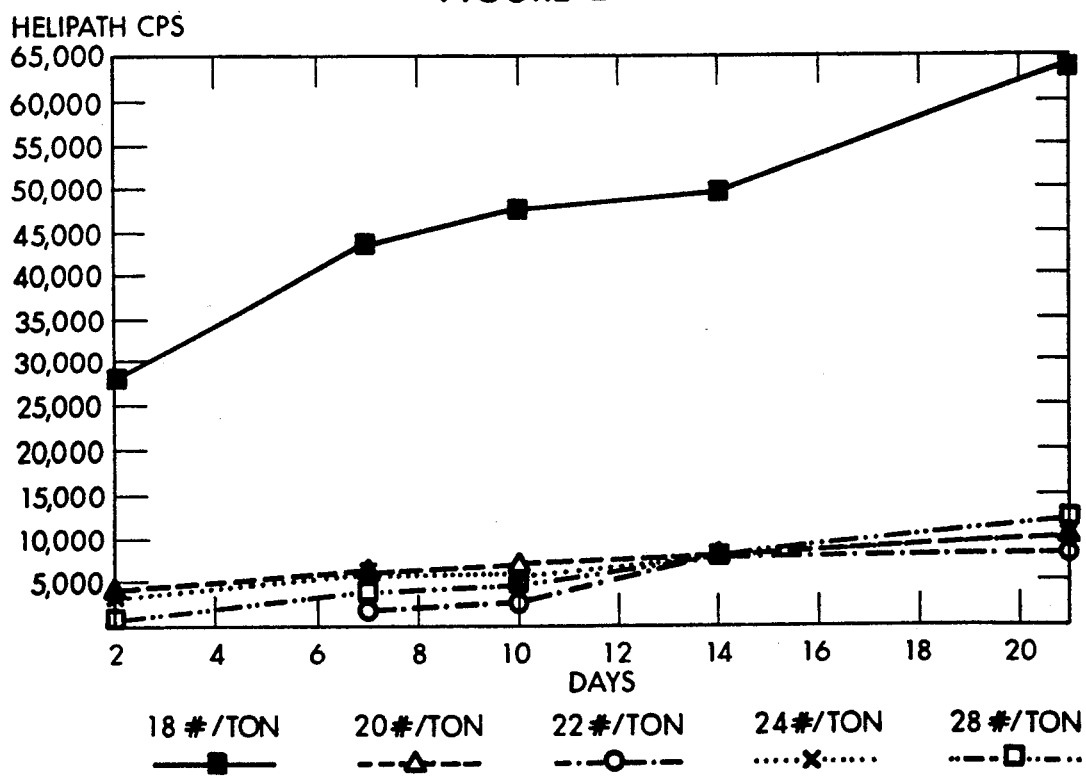

METHOD FOR PRODUCTION OF HIGH SOLID AQUEOUS CALCIUM CARBONATE SUSPENSIONS

This application is a continuation of application Ser. No. 546,397, filed Jun. 29, 1990 now abandoned.

BACKGROUND OF INVENTION

This invention relates generally to particulate calcium carbonates, and more specifically relates to the production of stable high solids aqueous slurries of such materials, for use, for example, in paper coating and other applications.

In recent years fine particle size calcium carbonates, either of natural calcitic origin or produced by means of chemical precipitation, have come into increasingly widespread use for paper coating and paper filling applications. Both the manufacturer, as well as the ultimate user of these materials, often finds it convenient to handle and/or ship such materials in the form of very high solids aqueous slurries, typically including, for example, 70% or more by weight of the particulate material. Indeed in some instances, it is of interest to attain slurries as high as 75 to 78% solids. In the past, however, it has proved extremely difficult to provide a slurry having such high solids characteristics which is stable over any sustained period. Depending upon the characteristics of the particulate material and on such dispersants as may be used, such high solids slurries, even if initially displaying satisfactory viscosity, show an increase or buildup in viscosity as a function of time (i.e. with aging). In many instances such slurries will actually set after a relatively brief period, sometimes measured in hours to days, into a unusable gelled mass.

Long term viscosity stability, however, is extremely important, as it enables the slurry manufacturer and the paper user to successfully handle, transfer and use the slurry. For example, high solid slurries of calcium carbonate are normally shipped in bulk in railway or truck tanker cars. The slurries are normally transferred from these tanker cars by pumping. The viscosity of the slurry at the transfer point is of critical importance to enable transfer. Similar considerations apply in subsequent storage, handling and use at the papermaker facility.

Prior art dispersants commonly used with calcium carbonate slurries include various types of water soluble polymeric dispersants. Among the most common and relatively effective agents used for these purposes, are the Dispex® products of Allied Colloids of Great Britain. In general, these constitute water soluble salts of polyacrylic or polymethacrylic acid and/or water soluble copolymers or water soluble copolymer derivatives of the type described e.g. in British Patent Specification No. 1,414,964.

While these prior art types of dispersing agents are generally effective where relatively limited periods of time are involved, it is found that the viscosity of high solids calcium carbonate slurries, based upon these materials, tends to increase rather rapidly over a period of several days or weeks.

More recently, dispersants have been introduced which are superior to the aforementioned products, particularly as regards longer term stability. These dispersants are produced by co-polymerization of a sulfonic acid containing monomer with acrylic acid which tends to produce a dispersant that adds charge stabilization to the steric stabilization that a pure polyacrylic acid type dispersant offers. Examples of these sulfonated copolymers are the Allied Colloids products DP 2020 and DP 2157. See European Patent Publications Nos. 0108842 and 0129329, and U.S. Pat. No. 4,509,987. These polymer products are fully neutralized with sodium cation. These sulfonated copolymers are more expensive than the prior art sodium polyacrylate Dispex® type dispersants. They also tend to be sensitive to the dosage level used in forming the dispersion. In particular, at lower dosage rates the salutary effects and stability provided by the newer materials are rapidly impaired.

In U.S. Pat. Nos. 4,775,420, and 4,868,228 to Gonnet et al, further types of dispersing agents are described in combination with mineral particles such as kaolins, carbonates and the like, including especially in combination with mixtures of such pigments, which are said to provide long term stability as well as good initial viscosities. The dispersing agents used are water soluble carboxyl-containing polymers which are converted to the salt form by at least one salt-forming agent which has a polyvalent function. The cation used may comprise calcium, magnesium, zinc, copper, lead, aluminum, and chromium. Various carboxyl-containing polymers are described, including those derived from (meth)acrylic acid, itaconic acid, crotonic acid, etc. The acid sites of the dispersing agent which are not neutralized by the polyvalent cation, can be neutralized by a salt-forming agent having a monovalent function to render the dispersant fully neutralized.

A commercial dispersant product believed to be in accord with the disclosures of the above Gonnet et al patents, is available from Coatex, S.A. Long term stability of high solids carbonate slurries prepared with this type of product is acceptable; however, higher dosages are required to achieve this result.

U.S. Pat. No. 4,840,985 to Gonnet et al discloses a process for preparing a stable aqueous mineral suspension of calcium carbonate using a grinding agent which may be a homopolymer or copolymers which are predominantly acrylic acid and contain at least one monomer selected from the group consisting of (meth)acrylic acid, etc., wherein from 40 to 80% of the acid groups of the homopolymer and copolymers have been neutralized with neutralizing agent, at least one of which has a monovalent function. Thus, the polymer dispersants are partially neutralized.

In accordance with the foregoing, it may be regarded as an object of the present invention, to provide a method for producing a high solids aqueous slurry of particulate calcium carbonate, wherein the resultant slurry possesses excellent viscosity characteristics, which characteristics are maintained over a very sustained period of time, whereby the viscosity buildup normally associated with slurry aging is avoided.

It is a further object of the invention, to provide a method of the foregoing character wherein the dispersant utilized is such that in practice of the method, the same outstanding results are achieved at lower dosage rates, and without undue sensitivity to excess dosage levels.

A yet further object of the invention, is to provide new dispersing compositions which are highly useful in producing high solids slurries of mineral particles, such as a calcium carbonate slurry, which slurries are stable over very long periods of time.

SUMMARY OF INVENTION

Now in accordance with the present invention, the foregoing objects and others as will become apparent in the course of the ensuing specification, are achieved in a method for producing a stable, high solids aqueous slurry of a fine particle sized particulate mineral, such as a calcium carbonate. According to the method, a slurry is formed by dispersing in water at least 70% by weight of a finely divided mineral particulate, utilizing as a dispersing agent from 20 to 34 lbs/ton dry mineral (expressed on the basis of 40% actives), and preferably from 22 to 24 lbs/ton dry mineral (expressed on the basis of 40% actives), of a water soluble copolymer of acrylic acid and a sulfonated vinyl monomer, which polymer is converted to the salt form by from about 30 to 50% by weight of its carboxylic acid sites being neutralized by a polyvalent cation, with substantially the balance of the said carboxylic acid sites being neutralized with a monovalent cation. The carboxylic acid sites of the resulting copolymer are therefore fully neutralized. The polyvalent cation can be calcium, aluminum or magnesium, and preferably is calcium. Preferably from about 35 to 45% of the carboxylic acid sites are neutralized with the polyvalent cation. The monovalent cation is preferably sodium; but other monovalent cations can be utilized. To achieve these purposes, such compounds as calcium hydroxide and sodium hydroxide may be used.

Where the method is used to prepare high solids (greater than 70%) slurries of calcium carbonates, the dispersed material will have a PSD (particle size distribution) such that at least 90% by weight of the particles have an ESD (equivalent spherical diameter) of less than 2 μm. The slurry of such a particulate can be formed by wet media grinding a relatively coarse feed calcium carbonate in the presence of the dispersant; the grinding can be accomplished at a wide range of solids, e.g. as low as 15%, with the solids being adjusted by filtration to the desired final product requirements.

The sulfonated dispersing agent used in this invention, is prepared from a starting sulfonated copolymer of the type mentioned above, which more specifically comprises a copolymer of from 1 to 75% (preferably 5 to 10%) by weight AMPS (2-acrylamido 2-methyl propane sulfonic acid) and 99 to 25% by weight acrylic acid, having a molecular weight in the range 1,000 to 20,000 (preferably 2,000 to 6,000). Dispersant polymers of this type are more fully described in European Patent Publications Nos. 0.129329, 0.108842, and U.S. Pat. No. 4,509,987. Also see Japanese Patent Publication 160062/80 (Application 54274/79). Such an unneutralized acidic starting polymer, in accordance with the present invention, is partially neutralized with monovalent cations, such that 50 to 70% of the carboxylic acid sites are neutralized. Thereafter, the remaining such carboxylic acid sites are neutralized with polyvalent cation. Such a product of the invention will from time to time in this specification be referred to as a sulfonated mixed cation carboxylic acid group neutralized dispersant (or briefly an "SMC" dispersant).

In a typical procedure in accordance with the invention, a coarse natural calcium carbonate (e.g. one which has been classified to 60% <2 μm) is wet sand ground at high solids, in the presence of the SMC dispersant, to 90%<2 μm, after which the sand is removed by screening. Depending upon the solids content during grinding, a filtration step may be used to achieve the final desired high solids slurry.

The SMC dispersant used in the media grinding is previously prepared by reacting the selected polyvalent and monovalent cation with the free acid sulfonated copolymer described above, in ratios appropriate to yield a carboxylic acid group neutralized copolymer, with 50 to 70% of the carboxyl groups being converted to salt form by monovalent cation, and the balance of the carboxyl groups being converted by polyvalent cation.

The dispersants of the invention can be used to effectively and stably disperse other fine particle sized mineral particulates in addition to calcium carbonates, including, for example, kaolins, talcs, gypsum and the like.

BRIEF DESCRIPTION OF THE DRAWINGS

In the drawings herein:

FIG. 1 is a graph of viscosity as a function of time for a high solids calcium carbonate slurry prepared according to the present invention, utilizing various dosage levels of an SMC dispersant;

FIG. 2 is a graph similar to FIG. 1, showing corresponding data for a further SMC dispersant;

DESCRIPTION OF PREFERRED EMBODIMENT

The invention is further illustrated by the following examples which, however, are to be considered exemplary, and not definitive of the invention otherwise set forth:

EXAMPLE I

Three different SMC dispersants were prepared by dissolving the unneutralized acidic sulfonated copolymer in water and adding NaOH and Ca(OH)$_2$ in ratios to result in products which contain respectively 50, 60, and 70% carboxylic acid groups that are neutralized with sodium, with the remaining carboxylic acid groups neutralized with calcium. These will be referred to in the ensuing Examples as SMC 50/25, SMC 60/20, and SMC 70/15. The starting polymer in this example was the sodium neutralized DP 2020 product of Allied Colloids of Great Britain, which was converted to the acid form by ion exchange. This copolymer contained 8% sulfonate groups (AMPS) and 92% acrylic groups in the copolymer backbone as determined by Carbon - 13 nuclear magnetic resonance studies.

EXAMPLE II

The SMC 50/25 dispersant of Example I was used in the preparation of a series of 75% solids calcium carbonate aqueous slurries in which the dosage rate was varied from 18 lbs/ton to 28 lbs/ton based on dry carbonate solids. The dispersant dose levels include 40% active polymer and 60% water. All dosage levels in this specification are based on this ratio. The slurries were prepared by sand media grinding of a 60% <2 μm calcium carbonate to 90% <2 μm in the presence of the SMC dispersant. The resultant screened (to remove sand) slurries were evaluated for slurry stability over a 21 day period. Stability was determined by measuring viscosities using a Brookfield Helipath Viscometer fitted with a T-bar. The resulting data is shown in FIG. 1 which plots viscosity in CPS against days of aging. In general, a viscosity above 20,000 CPS is unacceptable for shipping purposes. Accordingly, it will be seen that only the 24 lbs/ton and 28 lbs/ton dosage levels are acceptable. However, these are seen to produce virtually flat curves over the entire 21 day period, an outstanding result.

EXAMPLE III

The SMC 60/20 dispersant of Example I was used in the preparation of a further series of 75% solids calcium carbonate aqueous slurries as described in Example II. The resulting data is shown in FIG. 2 which plots viscosity as in Example I. It will be seen that in this instance a highly time-stable slurry was obtained for dosages as low as 20 lbs/ton. In fact, highly stable slurries were obtained for the four tests shown at 20 lbs/ton, 22 lbs/ton, 24 lbs/ton, and 28 lbs/ton. Only the 18 lbs/ton dosage rate yielded viscosities outside the desirable range, i.e. less than 20,000 CPS. The SMC 60/20 dispersant is considered relatively optimal for use in the present invention.

EXAMPLE IV

Figure 3:
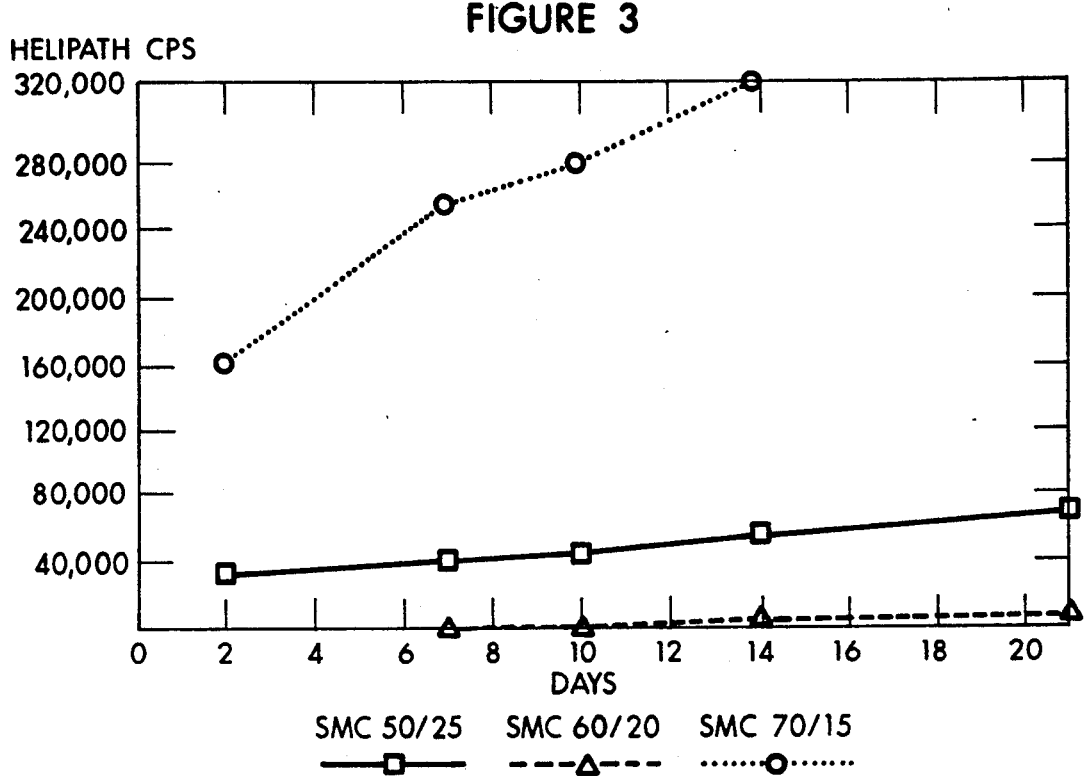
FIG. 3 is a graph similar to FIGS. 1 and 2, but depicting viscosities achieved in high solids calcium carbonate slurries for three different SMC dispersants as a function of time, with the dosage level being fixed.

In this Example, the three dispersants prepared in Example I were used in preparation of a series of 75% solids calcium carbonate aqueous slurries using in each instance a dosage of 22 lbs/ton. The Helipath viscosity in CPS was evaluated for each of the slurries as a function of aging. The results are shown in FIG. 3. It will be seen that only the SMC 60/20 in this instance yielded viscosities in the desired range, in fact an outstandingly stable product over the entire 21 day period, with virtually no increase in viscosity.

EXAMPLE V

Figure 4:
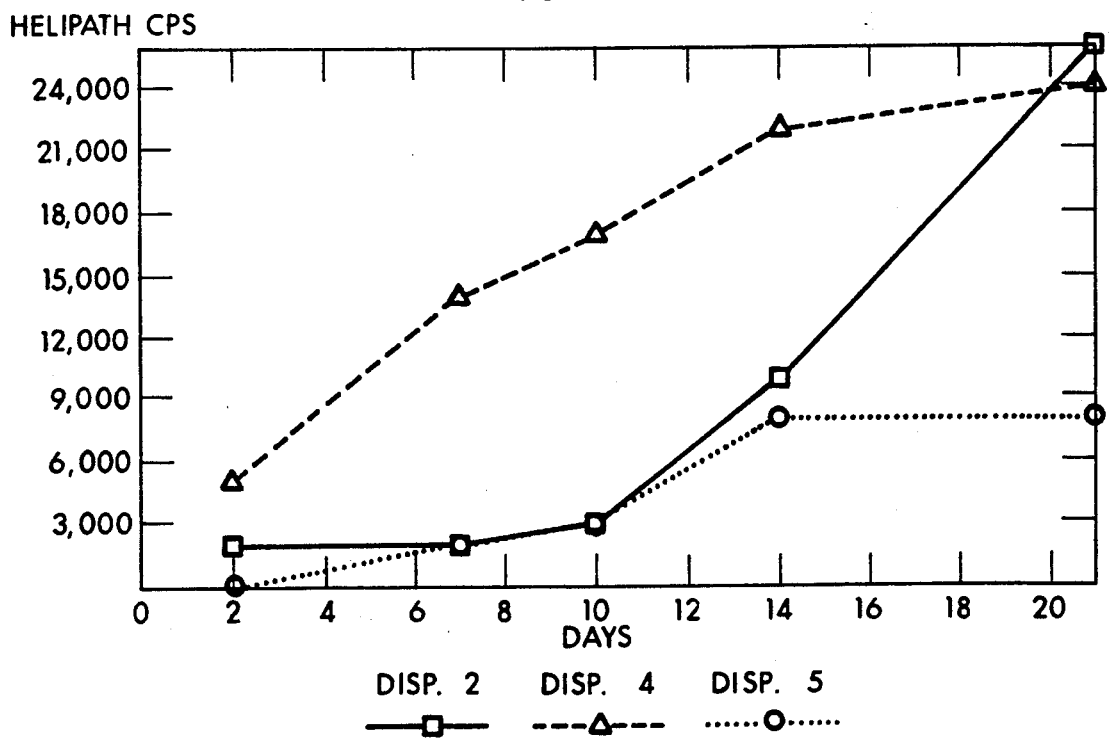
FIGS. 4 and 5 are graphs similar to FIG. 3, but showing viscosities achieved where the products of the invention are used, as compared to use of prior art products.
Figure 5:
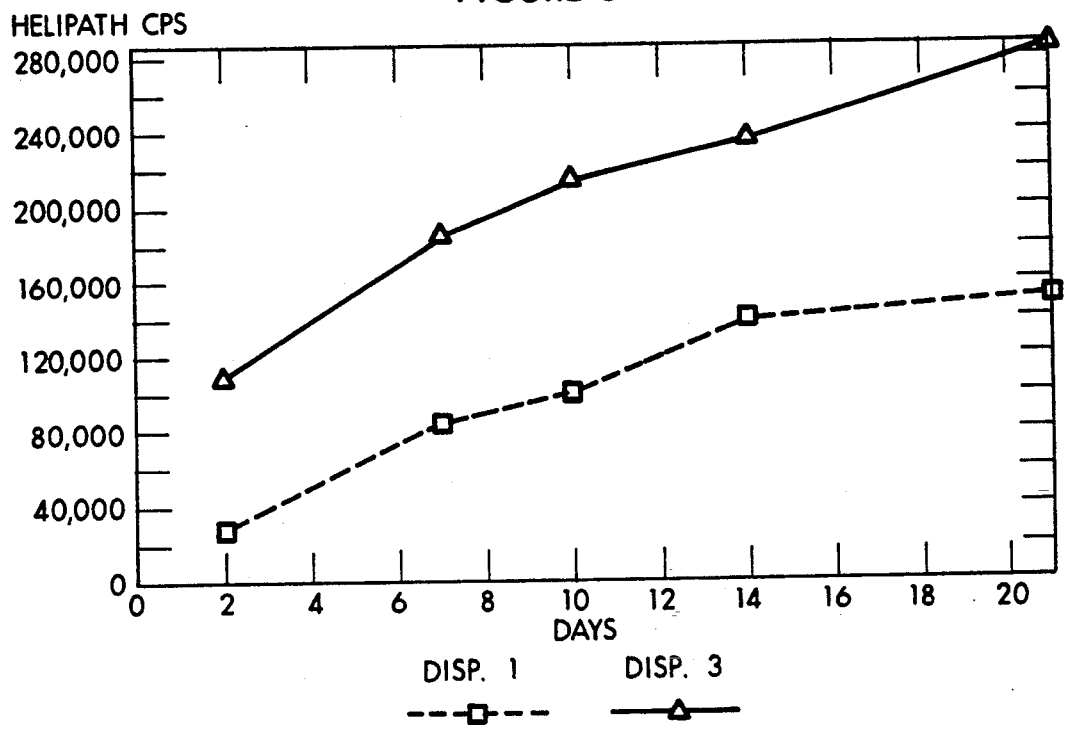

In this Example, a series of five different dispersants, including the SMC 60/20 product of the present invention were evaluated at 22 lbs/ton dosage in 75% solids calcium carbonate slurries prepared as in Example II. All five dispersants included 40% actives. Stability in terms of viscosities was evaluated over a 21 day period for each of the five products. The five dispersants, identified as Nos. 1–5, are as follows: Dispersant No. 1 is the Dispex N40 product of Allied Colloids, of Great Britain, being the conventional water soluble salts of polyacrylic or polymethacrylic acid or derivatives, of the type described e.g. in British Patent Specification No. 1,414,964. Dispersant 2 is an improved product of Allied Colloids understood to be of the type described in European Patent Publication No. 0129329 (discussed previously herein). Dispersant 3 is a product of Coatex S.A. of Caluire, France, believed to be of the type described in U.S. Pat. No. 4,775,420, previously discussed herein. Dispersant No. 4 is a fully neutralized sulfonated polymer (i.e. neutralized with sodium cation only) as described in U.S. Pat. No. 4,509,987. Dispersant No. 5 is the SMC 60/20 product of the present invention, previously referred to. The results of these tests are shown in FIGS. 4 and 5. The use of the prior art products of dispersants 1 and 3 yield results that are completely unacceptable over the entire period of evaluation. Dispersants 2, 4 and 5 are all found to yield acceptable results up to 14 days. However, of the entire group of dispersants evaluated, only the product of the invention, i.e. dispersant 5, is found to yield an entirely acceptable, indeed remarkably outstanding result, over the entire period extending up to 21 days.

EXAMPLE VI

Figure 6:
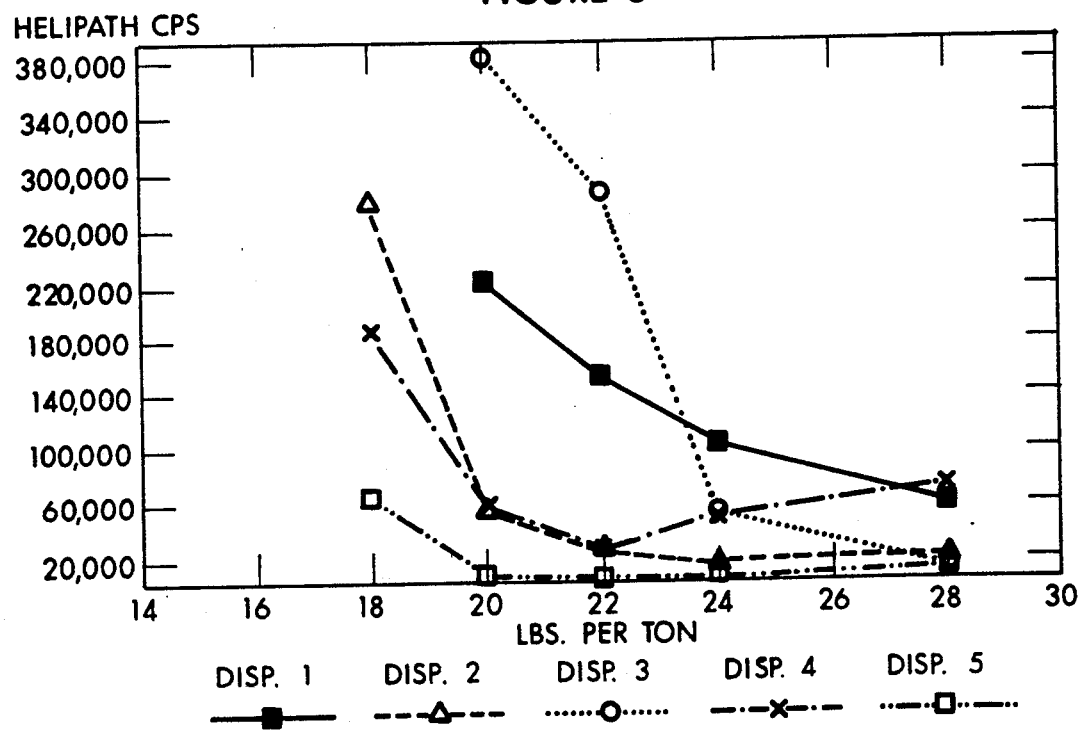
FIG. 6 is a graph similar to FIG. 4, showing the viscosities achieved where the same series of products are evaluated for 21 day stability over a range of dosage levels.

In this Example the same five dispersants described in Example V were evaluated over a range of dosage levels where each of the said products was used to prepare 75% solids calcium carbonate slurries as described in the previous Examples. The evaluatory period was again 21 days. The results of these tests are shown in FIG. 6, from which it will first be seen that the product of the invention, i.e. dispersant 5 yields a virtually flat curve having fully acceptable viscosity stabilities for all dosages from 20 up to 28 lbs/ton. In comparison, the various other dispersants depicted either are not acceptable over the entire range of dosage levels; or the dose level required to obtain stability (where acceptable) is generally higher than that required with the dispersant of the invention. Thus, the striking advantages of the invention, as illustrated in FIG. 6, are first that one may use lesser quantities of dispersant, thereby effecting substantial cost savings. Further, in view of the very flat curve, it is clear that in the present invention, sensitivity to dosage levels are eliminated or greatly reduced. In contrast, for example, in the case of dispersant 3, an acceptable result is not achieved until a dosage of 28 lbs/ton. The other dosage levels are unacceptable entirely. In the case of dispersant 4: This yields a good result at 22 lbs/ton; but at either a higher or lower level, the results become quickly unacceptable.

While the present invention has been set forth in terms of specific embodiments thereof, it will be understood in view of the instant teaching that numerous variations upon the invention are now enabled to those skilled in the art, which variations yet reside within the teachings of the present invention. Accordingly, the invention is to be broadly construed, and limited only by the scope and spirit of the claims now appended hereto.

We claim:

1. A method for producing a high solids aqueous slurry of particulate calcium carbonate having highly stable aging characteristics, comprising:
    dispersing in water at least 70% by weight solids of a finely divided particulate calcium carbonate in water, from 20 to 34 lbs (expressed on the basis of 40% actives) per ton of dry carbonate, of a salt form of a copolymer of acrylic acid and sulfonated vinyl monomer, having from about 30 to 50% of its carboxylic acid sites neutralized with a polyvalent cation, and substantially the balance of said carboxylic acid sites neutralized with a monovalent cation; wherein said copolymer is a polymerization product of from 1 to 75% by weight AMPS and 99 to 25% by weight of acrylic acid and having a molecular weight in the range of from about 1,000 to 20,000; and, wherein said polyvalent cation is selected from the group consisting of calcium, aluminum and magnesium.

2. A method in accordance with claim 1, containing from about 5 to 10% of said AMPS.

3. A method in accordance with claim 1, wherein said polyvalent cation is calcium, and wherein 35 to 45% of said acid sites are neutralized by said calcium.

4. A method in accordance with claim 1, wherein said monovalent cation is sodium.

5. A method in accordance with claim 1, wherein said particulate calcium carbonate has a PSD such that at least 90% by weight of the particles are <2 μm ESD.

6. A method in accordance with claim 5, wherein said slurry is formed by grinding an initially coarse feed calcium carbonate in the presence of said dispersing agent to yield the finely divided said particulate.

7. A method in accordance with claim 6, wherein said coarse feed is at least 60% <2 μm.

* * * * *